(12) United States Patent
Li

(10) Patent No.: US 12,413,347 B2
(45) Date of Patent: Sep. 9, 2025

(54) COMMUNICATION METHOD FOR DETERMINING PRIORITY OF HARQ-ACK INFORMATION, AND DEVICE

(71) Applicant: Beijing Xiaomi Mobile Software Co., Ltd., Beijing (CN)

(72) Inventor: Yuanyuan Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 377 days.

(21) Appl. No.: 17/904,070

(22) PCT Filed: Feb. 11, 2020

(86) PCT No.: PCT/CN2020/074713
§ 371 (c)(1),
(2) Date: Aug. 11, 2022

(87) PCT Pub. No.: WO2021/159272
PCT Pub. Date: Aug. 19, 2021

(65) Prior Publication Data
US 2023/0094455 A1    Mar. 30, 2023

(51) Int. Cl.
*H04L 1/1829* (2023.01)
(52) U.S. Cl.
CPC .......... *H04L 1/1854* (2013.01); *H04L 1/1861* (2013.01)
(58) Field of Classification Search
CPC .... H04L 1/1854; H04L 1/1861; H04L 1/1864
See application file for complete search history.

(56) References Cited

U.S. PATENT DOCUMENTS

| | | | |
|---|---|---|---|
| 2015/0124719 A1* | 5/2015 | Lim | H04L 1/1848 370/329 |
| 2018/0123765 A1* | 5/2018 | Cao | H04L 1/1819 |
| 2019/0261361 A1 | 8/2019 | Xiong et al. | |
| 2019/0306923 A1* | 10/2019 | Xiong | H04J 13/0062 |
| 2019/0363843 A1* | 11/2019 | Gordaychik | H04W 72/044 |
| 2021/0160903 A1* | 5/2021 | Kim | H04L 1/1861 |
| 2023/0042048 A1* | 2/2023 | Kim | H04B 7/063 |
| 2024/0305416 A1* | 9/2024 | Gou | H04L 1/1896 |

FOREIGN PATENT DOCUMENTS

| | | |
|---|---|---|
| CN | 110505040 A | 11/2019 |
| CN | 110535568 A | 12/2019 |
| CN | 110708146 A | 1/2020 |

(Continued)

OTHER PUBLICATIONS

International Search Report issued Oct. 28, 2020 in PCT/CN2020/074713, filed on Feb. 11, 2020, 2 pages.

(Continued)

*Primary Examiner* — Tejis Daya
(74) *Attorney, Agent, or Firm* — Oblon, McClelland, Maier & Neustadt, L.L.P.

(57) ABSTRACT

A communication method that can include receiving indication information, the indication information comprising an information field for indicating a packet identifier of a physical downlink shared channel (PDSCH); and determining, according to the information field, a priority of hybrid automatic repeat request acknowledgement (HARQ-ACK) information corresponding to the physical downlink shared channel (PDSCH).

14 Claims, 3 Drawing Sheets

(56) References Cited

FOREIGN PATENT DOCUMENTS

| WO | WO-2018086071 A1 | * | 5/2018 | ........... H04L 1/1607 |
| WO | WO 2019/172624 A1 | | 9/2019 | |
| WO | WO-2019242526 A1 | * | 12/2019 | |
| WO | WO-2020221271 A1 | * | 11/2020 | ........... H04L 1/0003 |

OTHER PUBLICATIONS

"HARQ enhancements in NR unlicensed", Huawei, HiSilicon, 3GPP TSG RAN WG1 Meeting #97, R1-1906046, Reno, USA, May 13-17, 2019, Agenda Item: 7.2.2.2.3, Document for: Discussion and decision , 14 pages.

"HARQ enhancements for NR-U", Fujitsu, 3GPP TSG RAN WG1 #98bis, R1-1912076, Reno, USA, Nov. 18-22, 2019, Agenda Item: 7.2.2.2.3, Document for: Discussion/Decision, 5 pages.

"Enhancements to HARQ for NR-unlicensed", Intel Corporation, 3GPP TSG RAN WG1 Meeting #99, R1-1912199, Reno, USA, Nov. 18-22, 2019, Agenda Item: 7.2.2.2.3, Document for: Discussion/Decision, 13 pages.

"Discussion on HARQ enhancement for NR-U", Xiaomi, 3GPP TSG RAN WG1 #99, R1-1911992, Reno, USA, Nov. 18-22, 2019, Agenda item: 7.2.2.2.3, Document for: Discussion, 3 pages.

Chinese Office Action issued Jan. 5, 2024 in corresponding Chinese Patent Application No. 202080000282.9, 4 pages.

Sony, "Multiple HARQ-ACK PUSCH transmissions in a slot." 3GPP TSG RAN WG1 #96bis. R1-1904235, Xi'an, China, Apr. 8-12, 2019, 5 pages.

* cited by examiner

COMMUNICATION METHOD FOR DETERMINING PRIORITY OF HARQ-ACK INFORMATION, AND DEVICE

CROSS-REFERENCE TO RELATED APPLICATIONS

The present application is a National Stage of International Application No. PCT/CN2020/074713, filed on Feb. 11, 2020, the contents of all of which are incorporated by reference herein in their entireties.

BACKGROUND OF THE INVENTION

Field of the Invention

The present disclosure relates to the field of communication, and in particular, to a communication method, apparatus, device, and readable storage medium.

Description of the Related Art

The 3rd Generation Partnership Project (3GPP) defines three major directions for 5G application scenarios: Enhance Mobile Broadband (eMBB), Massive Machine Type of Communication (mMTC), and Ultra High reliability and ultra-low latency communication (Ultra Reliable & Low Latency Communication, URLLC).

SUMMARY OF THE INVENTION

According to an aspect of the present disclosure, there is provided a communication method, applied in a terminal, the method includes receiving indication information, the indication information including an information field for indicating a group identifier of a physical downlink shared channel (PDSCH, and determining a priority of hybrid automatic repeat request acknowledgement (HARQ-ACK) information corresponding to the physical downlink shared channel (PDSCH) according to the information field.

According to another aspect of the present disclosure, there is provided a communication method, applied to an access network device, and the method includes configuring a group identifier of a physical downlink shared channel (PDSCH), where the group identifier is used for indicating a priority of hybrid automatic repeat response request acknowledgement (HARQ-ACK) information corresponding to the physical downlink shared channel (PDSCH), and sending indication information to a terminal, where the indication information includes an information field for indicating the group identifier of the physical downlink shared channel (PDSCH).

According to another aspect of the present disclosure, there is provided a communication apparatus, applied in a terminal, and the apparatus includes a receiving module, configured to receive indication information, the indication information including an information field for indicating a group identifier of a physical downlink shared channel (PDSCH), and a processing module, configured to determine a priority of hybrid automatic repeat request acknowledgement (HARQ-ACK) information corresponding to the physical downlink shared channel (PDSCH) according to the information field.

According to another aspect of the present disclosure, there is provided a communication apparatus, applied to an access network device, and the apparatus includes:

a processing module, configured to configure a group identifier of a physical downlink shared channel (PDSCH), where the group identifier is used for indicating a priority of hybrid automatic repeat response request acknowledgement (HARQ-ACK) information corresponding to the physical downlink shared channel (PDSCH); and a sending module, configured to send indication information to a terminal, where the indication information includes an information field for indicating the group identifier of the physical downlink shared channel (PDSCH).

In another aspect, there is provided a terminal, and the terminal includes a processor and a transceiver connected to the processor. The processor is configured to load and execute executable instructions to implement the communication method as described in the above embodiments of the present disclosure.

In another aspect, there is provided an access network device, and the access network device includes a processor and a transceiver connected to the processor. The processor is configured to load and execute executable instructions to implement the communication method as described in the above embodiments of the present disclosure.

In another aspect, there is provided a non-transitory computer-readable storage medium, and the computer-readable storage medium stores at least one instruction, at least one piece of program, code set or instruction set, the above-mentioned at least one instruction, at least one piece of program, the code set or the instruction set is loaded and executed by a processor to implement the communication method as described in the above-described embodiments of the present disclosure.

BRIEF DESCRIPTION OF THE DRAWINGS

In order to illustrate the technical solutions in the embodiments of the present disclosure more clearly, the following briefly introduces the accompanying drawings used in the description of the embodiments. Obviously, the accompanying drawings in the following description are only some embodiments of the present disclosure. For those ordinary skilled in the art, other drawings can also be obtained from these drawings without creative effort.

DETAILED DESCRIPTION OF THE PREFERRED EMBODIMENTS

In order to make the objectives, technical solutions and advantages of the present disclosure clearer, the embodiments of the present disclosure will be further described in detail below with reference to the accompanying drawings.

Figure 1:
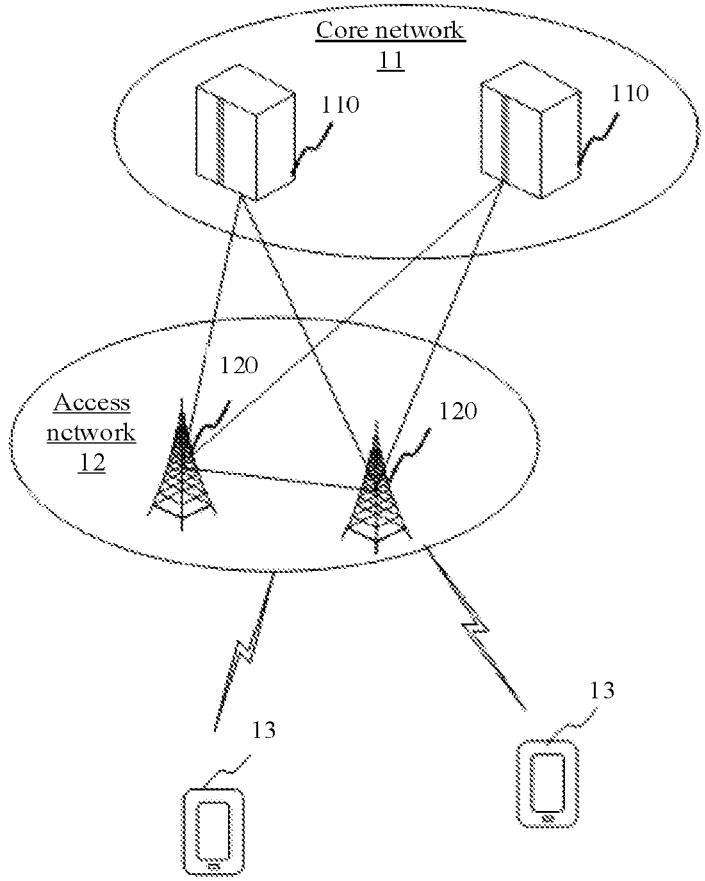
FIG. 1 shows a block diagram of a communication system provided by an embodiment of the present disclosure.

FIG. 1 shows a block diagram of a communication system provided by an embodiment of the present disclosure. The communication system may include: a core network 11, an access network 12 and a terminal 13.

The core network 11 includes several core network devices 110. The core network device 110 includes an access and mobility management function (Access and Mobility Management Function, AMF), a session management function (Session Management Function, SMF), and a user interface management function (User Plane Function, UPF) and other equipment, where AMF is used to control the access authority and switching functions of the terminal, SMF is used to provide server continuity and uninterrupted user experience of the server, such as IP address and anchor point changes.

The access network 12 includes several access network devices 120. The access network device 120 may be a base station, and the base station is a device deployed in an access network to provide a wireless communication function for a terminal. The base station may include various forms of macro base station, micro base station, relay station, access point and so on. In systems using different radio access technologies, the names of devices with base station functions may be different. For example, in Long Term Evolution (LTE) systems, they are called eNodeBs or eNBs; In the New Radio (NR) system, it is called gNode B or gNB. With the evolution of communication technology, the description of the name "base station" may change. For the convenience of the embodiments of the present disclosure, the foregoing devices for providing a wireless communication function for a terminal are collectively referred to as access network device.

The terminal 13 may include various handheld devices, vehicle-mounted devices, wearable devices, computing devices with wireless communication functions, or other processing devices connected to the wireless modem, as well as various forms of terminals (User Equipment, UE), mobile stations (Mobile Station, MS), terminal (terminal device) and so on. For the convenience of description, the devices mentioned above are collectively referred to as terminals. The access network device 120 and the terminal 13 communicate with each other through some air interface technology, such as a Uu interface.

In some examples, in the process of wireless communication between the terminal 13 and the access network device 120, wireless communication may be performed through a licensed frequency band, or wireless communication may be performed through an unlicensed frequency band. In some examples, in the embodiment of the present disclosure, the wireless communication between the terminal 13 and the access network device 120 through an unlicensed frequency band is used as an example for description.

In the NR system, the uplink control information (UCI) is control information carried on the physical uplink control channel (PUCCH) or the physical uplink shared channel (PUSCH) and sent by the UE to the base station. Among them, the UCI includes the response information (Hybrid Automatic Repeat request Acknowledge character, HARQ-ACK) of the downlink data, which is used to feedback whether the received downlink data has been correctly received to the base station. The response information includes an acknowledge character (ACK) and a negative acknowledgement character (NACK), where the acknowledgement character is used to indicate the downlink data that the UE has received correctly, and the NACK is used to indicate the downlink data that the UE has failed to receive.

In the standard discussion and design of R16NR unlicensed spectrum (NR-Unlicensed, NR-U), the downlink control information (Downlink Control Information, DCI) for scheduling the Physical Downlink Share Channel (PDSCH) includes information field for indicating the group identifier of the PDSCH, that is, the DCI includes the PDSCH group ID field, which is used to indicate the group identifier of the PDSCH. Currently, the protocol supports two PDSCH groups, that is, the above-mentioned group identifier of the PDSCH occupies 1 bit. The PDSCH using the same PDSCH group ID will feed back HARQ-ACK information in a same HARQ-ACK feedback resource, and the HARQ-ACK information of the PDSCH using the same PDSCH group ID will be placed in a same HARQ-ACK codebook, and be transmit in the feedback resource. The HARQ-ACK feedback resources used by the HARQ-ACK codebooks corresponding to different PDSCH group IDs are respectively designated by the base station.

There are eMBB services, URLLC services, and mMTC services in the 5G system. Among them, the URLLC service is a service type that demands high reliability and low latency, and the eMBB service is a service type that demands a higher data transmission rate. In the discussion of the R16 URLLC service, in order to support two types of HARQ-ACK codebooks with high and low priorities, corresponding to the URLLC service and the eMBB service respectively, for the dynamically scheduled PDSCH, 1 bit in the DCI refers to whether the HARQ-ACK codebook corresponding to the HARQ-ACK information of the PDSCH is a high-priority codebook or a low-priority codebook. For example, the content of the information field included in the DCI is 0, which is used to indicate that the HARQ-ACK information of the PDSCH scheduled by the DCI is placed in the low-priority HARQ-ACK codebook for transmission; the content of the information field included in the DCI is 1, which is used to indicate the HARQ-ACK information of the PDSCH scheduled by the DCI is placed in a high-priority HARQ-ACK codebook for transmission.

When the UE processes the HARQ-ACK codebooks with high and low priorities, it processes the HARQ-ACK codebooks with corresponding processing rules, such as: when the PUCCH resource of the high priority HARQ-ACK codebook and the PUCCH resource of the low priority HARQ-ACK codebook conflicts in time domain, the UE will discard the PUCCH channel of the low-priority HARQ-ACK codebook, that is, discard the low-priority HARQ-ACK codebook, and only transmit the PUCCH channel of high-priority HARQ-ACK codebook. Or, the UE transmits the PUCCH channel of high-priority HARQ-ACK codebook, discards the PUCCH channel of low-priority HARQ-ACK codebook, and carries the low-priority HARQ-ACK codebook to another PUCCH resource later in time domain for transmission. Or, channel multiplexing is performed on the high-priority HARQ-ACK codebook and the low-priority HARQ-ACK codebook that satisfy the channel multiplexing conditions, and one PUCCH resource is selected to transmit the high-priority HARQ-ACK codebook and the low-priority HARQ-ACK codebook; for those that do not satisfy the channel multiplexing conditions, the high-priority HARQ-ACK codebook is transmitted and the low-priority HARQ-ACK codebook is discarded.

However, taking the URLLC service as an example, when the base station schedules the URLLC service on the unlicensed frequency band, the method for indicating the priority of the hybrid automatic repeat request acknowledgement (HARQ-ACK) information of the scheduled physical downlink shared channel has not yet been determined.

Embodiments of the present disclosure provide a priority determination method, apparatus, device, and readable storage medium, which can be used to indicate the priority of HARQ-ACK information of a scheduled PDSCH when the base station schedules different types of services on the unlicensed frequency band. The technical solution is as follows.

Figure 2:
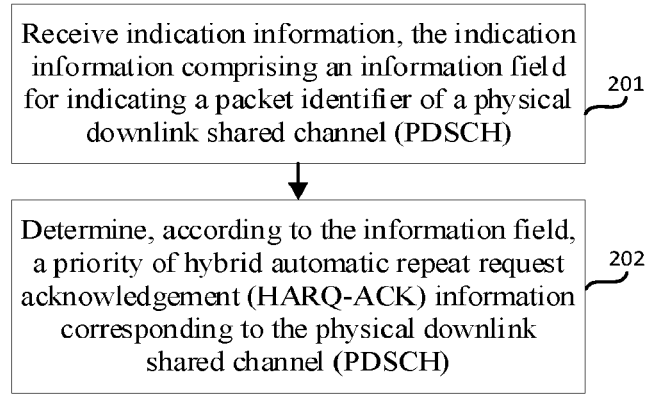
FIG. 2 shows a flowchart of a communication method provided by an embodiment of the present disclosure.

FIG. 2 is a flowchart of a communication method provided by an embodiment of the present disclosure. The method is applied to a terminal as an example for description. In some examples, the terminal operates at least in part in an unlicensed frequency band. As shown in FIG. 2, the method includes:

Step 201, indication information is deceived, where the indication information includes an information field used to indicate a group identifier of a physical downlink shared channel (PDSCH). The indication information includes any one of physical layer signaling, radio resource control (Radio Resource Control, RRC) signaling, and media access control element (Media Access Control Element, MAC CE). In some embodiments of the present disclosure, the indication information is implemented as physical layer signaling as an example for description. In some examples, the indication information is downlink control information (DCI).

In some examples, the indication information includes an information field used to indicate the group identifier of the PDSCH. In some examples, the information field used to indicate the group identifier of the PDSCH occupies 1 bit. Illustratively, the DCI includes a PDSCH group ID information field. When the value of the information field is 1, it indicates that the PDSCH belongs to group 1, and when the value of the information field is 0, it indicates that the PDSCH belongs to group 0.

Step 202, the priority of the HARQ-ACK information corresponding to the physical downlink shared channel (PDSCH) is determined according to the information field.

In some examples, the priority of the HARQ-ACK information corresponding to the PDSCH is determined according to the information field indicating the group identifier of the PDSCH. The priority of the HARQ-ACK information is determined according to the value of the information field of the group identifier.

When the information field of the group identifier takes the first value, it is determined that the PDSCH belongs to the first group, and the HARQ-ACK information is determined as the first priority; when the information field of the group identifier takes the second value, it is determined that the PDSCH belongs to the second group, and the HARQ-ACK information is determined as the second priority, where the first priority is higher than the second priority, or the second priority is higher than the first priority.

Illustratively, the protocol supports two PDSCH groups as an example for illustrative description. The DCI includes the PDSCH group ID information field. When the value of the information field is 1, it indicates that the PDSCH belongs to group 1, and at the same time, it indicates that the HARQ-ACK information corresponding to the PDSCH belongs to the first priority; when the value of the information field is 0, it indicates that the PDSCH belongs to group 0, and at the same time it indicates that the HARQ-ACK information corresponding to the PDSCH belongs to the second priority, where the first priority is higher than the second priority, or, the second priority is higher than the first priority.

Illustratively, the DCI includes the PDSCH group ID information field. When the value of the information field is 1, it indicates that the HARQ-ACK information corresponding to the PDSCH belongs to a high priority, and when the value of the information field is 0, it indicates that the HARQ-ACK information corresponding to the PDSCH belongs to the low priority; or, when the value of the information field is 1, it indicates that the HARQ-ACK information corresponding to the PDSCH belongs to a low priority, and when the value of the information field is 0, it indicates that the HARQ-ACK information corresponding to the PDSCH belongs to a high priority.

To sum up, the communication method provided in this embodiment indicates the priority of the HARQ-ACK information corresponding to the PDSCH through the information field of the group identifier of the PDSCH, so that even in the application scenario of the unlicensed frequency band, the priority of the HARQ-ACK information can also be indicated, thereby performing scheduling of different priorities according to service types, avoiding modifications to a DCI format of an existing protocol, and improving the simplicity and consistency of the protocol.

Figure 3:
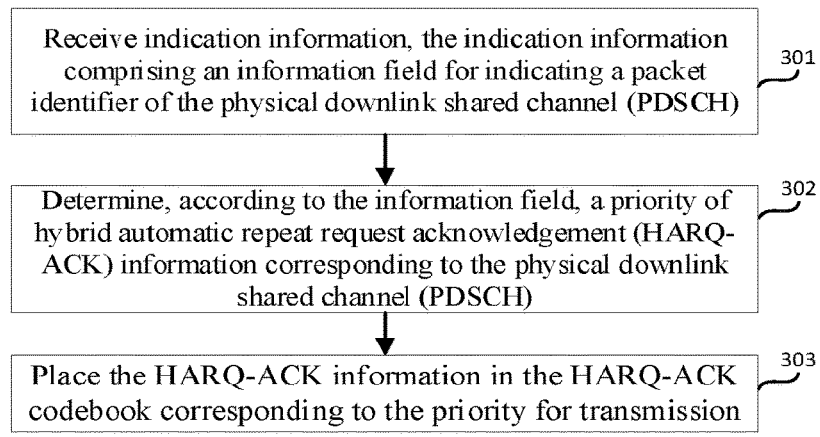
FIG. 3 shows a flowchart of a communication method provided by another embodiment of the present disclosure.

In an embodiment, after the priority of the HARQ-ACK information is determined, the HARQ-ACK information is placed in the corresponding HARQ-ACK codebook for transmission. FIG. 3 is a flow chart of a communication method provided by an embodiment of the present disclosure. The method is applied to a terminal as an example for description. As shown in FIG. 3, the method includes:

Step 301, indication information is received, where the indication information includes an information field used to indicate the group identifier of the physical downlink shared channel (PDSCH). The indication information includes the information field used to indicate the group identifier of the PDSCH. In some examples, the information field used to indicate the PDSCH group identity occupies 1 bit. Illustratively, the DCI includes a PDSCH group ID information field. When the value of the information field is 1, it indicates that the PDSCH belongs to group 1, and when the value of the information field is 0, it indicates that the PDSCH belongs to group 0.

Step 302, the priority of the hybrid automatic repeat request acknowledgement (HARQ-ACK) information corresponding to the physical downlink shared channel (PDSCH) is determined according to the information field. The priority of the HARQ-ACK information corresponding to the PDSCH is determined according to the information field indicating the group identifier of the PDSCH. In some examples, the priority of the HARQ-ACK information is determined according to the value of the information field of the group identifier.

When the information field of the group identifier takes the first value, it is determined that the PDSCH belongs to the first group, and the HARQ-ACK information is determined as the first priority; when the information field of the group identifier takes the second value, it is determined that the PDSCH belongs to the second group, and the HARQ-ACK information is determined as the second priority, where the first priority is higher than the second priority, or the second priority is higher than the first priority.

Step 303, the HARQ-ACK information is placed in the HARQ-ACK codebook corresponding to the priority for transmission. When the HARQ-ACK information is the first priority, the HARQ-ACK information is placed in the first priority codebook for transmission; and when the HARQ- ACK information is the second priority, the HARQ-ACK information is placed in the second priority codebook for transmission.

When the information field of the group identifier takes the first value, it is determined that the PDSCH belongs to the first group, the HARQ-ACK information is determined as the first priority, and the HARQ-ACK information is placed in the first HARQ-ACK codebook for transmission, where the first HARQ-ACK codebook is the first priority codebook; when the information field of the group identifier takes the second value, it is determined that the PDSCH belongs to the second group, the HARQ-ACK information is determined as the second priority, and the HARQ-ACK information is placed in the second HARQ-ACK codebook for transmission, the second HARQ-ACK codebook is the second priority codebook, where the first priority is higher than the second priority, or the second priority is higher than the first priority.

The UE transmits the HARQ-ACK codebook in the PUCCH or the Physical Uplink Shared Channel (PUSCH). Illustratively, in this embodiment, the UE transmits the HARQ-ACK codebook in the PUCCH as an example for description. In response to determining that at least two PUCCH resources carrying the HARQ-ACK codebook conflict in time domain, the HARQ-ACK codebook is transmitted according to the priority of the HARQ-ACK codebook.

In some examples, when at least two PUCCH resources carrying HARQ-ACK codebooks conflict in time domain, the HARQ-ACK codebook of the first priority is transmitted, and the HARQ-ACK codebook of the second priority is discarded. Or, when at least two PUCCH resources carrying HARQ-ACK codebooks conflict in time domain, the PUCCH channel of the first priority HARQ-ACK codebook is transmitted, the PUCCH channel of the second priority HARQ-ACK codebook is discarded, and the second priority HARQ-ACK codebook is carried to another PUCCH resource later in time domain for transmission. Or, channel multiplexing is performed on the first priority HARQ-ACK codebook and the second priority HARQ-ACK that satisfy the channel multiplexing conditions, and a PUCCH resource is selected to transmit the first priority HARQ-ACK codebook and the second priority HARQ-ACK codebook. For those that do not satisfy the channel multiplexing conditions, the first priority HARQ-ACK code is transmitted, and the second priority HARQ ACK codebook is discarded. Among them, the first priority is higher than the second priority.

Illustratively, in response to determining that the PUCCH resources carrying the first HARQ-ACK codebook and the second HARQ-ACK codebook conflict in time domain, the first HARQ-ACK codebook is transmitted, and the second HARQ-ACK codebook is discarded. Or, when the PUCCH resources carrying the first HARQ-ACK codebook and the second HARQ-ACK codebook conflict in time domain, the PUCCH channel of the first HARQ-ACK codebook is transmitted, the PUCCH channel of the second HARQ-ACK codebook is discarded, and the second HARQ-ACK codebook is carried to another PUCCH resource later in e time domain for transmission. Or, channel multiplexing is performed on the first HARQ-ACK codebook and the second HARQ-ACK codebook that satisfy the channel multiplexing conditions, a PUCCH resource is selected to transmit the first HARQ-ACK codebook and the second HARQ-ACK codebook. For those that do not satisfy the channel multiplexing conditions, the first HARQ-ACK codebook is transmitted, and the second HARQ-ACK codebook is discarded.

To sum up, the communication method provided in this embodiment indicates the priority of the HARQ-ACK information corresponding to the PDSCH by means of the information field of the group identifier of the PDSCH, such that even in an application scenario of an unlicensed frequency band, the priority of the HARQ-ACK information can also be indicated, thereby performing scheduling of different priorities according to service types, avoiding modifications to a DCI format of an existing protocol, and improving the simplicity and consistency of the protocol.

The communication method provided by this embodiment distinguishes the first priority and the second priority of the HARQ-ACK information by using the first value and the second value of the information field of the group identifier, so as to perform scheduling with high and low priority according to the service type.

Figure 4:
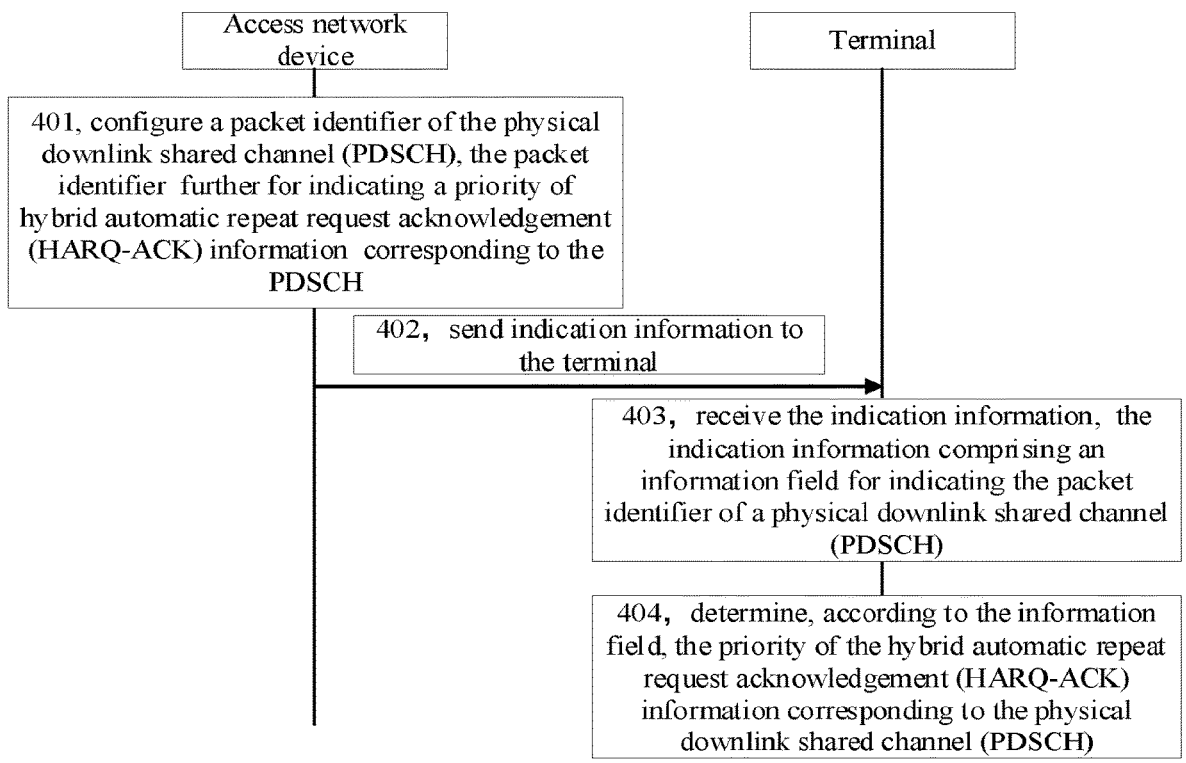
FIG. 4 shows a flowchart of a communication method provided by another embodiment of the present disclosure.

In an embodiment, the access network device first determines the priority of the HARQ-ACK information, and then assigns a value to the information field of the group identifier of the PDSCH. FIG. 4 is a flowchart of a communication method provided by an embodiment of the present disclosure. The method is applied to the interaction between the terminal and the access network device as an example for description. As shown in FIG. 4, the method includes:

Step 401, the access network device configures the group identifier of the physical downlink shared channel (PDSCH), and the group identifier is further used to indicate the priority of the hybrid automatic repeat request acknowledgement (HARQ-ACK) information corresponding to the PDSCH.

In some examples, the access network device at least partially operates in an unlicensed frequency band.

The access network device determines the corresponding value according to the priority of the HARQ-ACK information, and determines the value as the value of the group identifier of the PDSCH.

In response to the HARQ-ACK information being the first priority, the priority of the HARQ-ACK information is determined to correspond to the first value; in response to the HARQ-ACK information being the second priority, the priority of the HARQ-ACK information is determined to correspond to the second value; the first priority is higher than the second priority.

The access network device determines the priority of the HARQ-ACK information according to the service type scheduled by the DCI of the PDSCH, and determines the corresponding value. Illustratively, when the service scheduled by the DCI is the URLLC service, the priority of the HARQ-ACK information is determined as the first priority; when the service scheduled by the DCI is the eMBB service, the priority of the HARQ-ACK information is determined as the second priority, and the first priority is higher than the second priority.

Step 402, the access network device sends indication information to the terminal. In some examples, the terminal operates at least partially in an unlicensed frequency band.

The access network device sends indication information to the terminal, where the indication information includes an information field used to indicate the group identifier of the physical downlink shared channel (PDSCH), and the information field is also used to indicate the priority of the HARQ-ACK information.

Step 403, the terminal receives indication information, where the indication information includes the information field used to indicate the group identifier of the physical downlink shared channel (PDSCH). The indication information includes the information field used to indicate the group identifier of the PDSCH. In some examples, the information field used to indicate the group identifier of the PDSCH occupies 1 bit. Illustratively, the DCI includes a PDSCH group ID information field. When the value of the information field is 1, it indicates that the PDSCH belongs to group 1, and when the value of the information field is 0, it indicates that the PDSCH belongs to group 0.

Step 404, the terminal determines the priority of the hybrid automatic repeat request acknowledgement (HARQ-ACK) information corresponding to the physical downlink shared channel (PDSCH) according to the information field. The priority of the HARQ-ACK information corresponding to the PDSCH is determined according to the information field indicating the group identifier of the PDSCH. In some examples, the priority of the HARQ-ACK information is determined according to the value of the information field of the group identifier.

To sum up, the communication method provided in this embodiment indicates the priority of the HARQ-ACK information corresponding to the PDSCH by means of the information field of the group identifier of the PDSCH, such that even in an application scenario of an unlicensed frequency band, the priority of the HARQ-ACK information can also be indicated, thereby performing scheduling of different priorities according to service types, avoiding modifications to a DCI format of an existing protocol, and improving the simplicity and consistency of the protocol.

Figure 5:
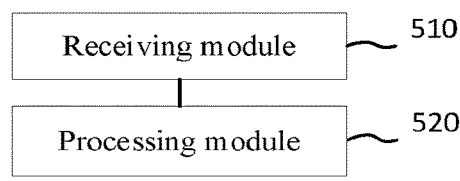
FIG. 5 shows a structural block diagram of a communication apparatus provided by an embodiment of the present disclosure.

FIG. 5 is a structural block diagram of a communication apparatus provided by an embodiment of the present disclosure. Taking the device applied to a terminal as an example, as shown in FIG. 5, the device includes a receiving module 510, configured to receive indication information, where the indication information includes an information field used to indicate the group identifier of the physical downlink shared channel (PDSCH), and a processing module 520, configured to determine, according to the information field, the priority of the hybrid automatic repeat response request HARQ-ACK information corresponding to the physical downlink shared channel (PDSCH).

In an embodiment, the processing module 520 is further configured to determine the priority of the HARQ-ACK information according to the value of the information field of the group identifier.

Figure 6:
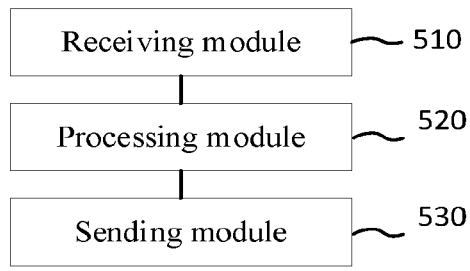
FIG. 6 shows a structural block diagram of a communication apparatus provided by another embodiment of the present disclosure.

In an embodiment, as shown in FIG. 6, the apparatus further includes a sending module 530, configured to place the HARQ-ACK information in a HARQ-ACK codebook corresponding to the priority for transmission. In an embodiment, the sending module 530 is further configured to, in response to determining that at least two PUCCH resources carrying the HARQ-ACK codebook conflict in time domain, transmit the HARQ-ACK codebook according to the priority of the HARQ-ACK codebook.

In an embodiment, the processing module 520 is further configured to determine that the HARQ-ACK information as the first priority in response to the information field of the group identifier taking a first value.

The processing module 520 is further configured to determine the HARQ-ACK information as a second priority in response to the information field of the group identifier taking a second value, and the first priority is higher than the second priority.

In an embodiment, the apparatus further includes a sending module 530, configured to place the HARQ-ACK information in a first HARQ-ACK codebook for transmission in response to the information field of the group identifier taking a first value, where the first HARQ-ACK codebook is first priority codebook. The sending module 530 is further configured to place the HARQ-ACK information in a second HARQ-ACK codebook for transmission in response to the information field of the group identifier taking a second value, and the second HARQ-ACK codebook is the second priority codebook.

In an embodiment, the sending module 530 is further configured to, in response to determining that the PUCCH resources carrying the first HARQ-ACK codebook and the second HARQ-ACK codebook conflict in time domain, transmit the first HARQ-ACK codebook and discard the second HARQ-ACK codebook.

In an embodiment, the indication information includes at least one of radio resource control (RRC) signaling, medium access control control element (MAC CE) or physical layer downlink control information.

In an embodiment, the terminal operates at least partially in an unlicensed frequency band.

Figure 7:
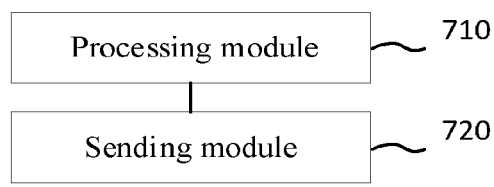
FIG. 7 shows a structural block diagram of a communication apparatus provided by another embodiment of the present disclosure.

FIG. 7 is a structural block diagram of a communication apparatus provided by another embodiment of the present disclosure. Taking the apparatus applied to an access network device as an example, as shown in FIG. 7, the apparatus includes a processing module 710, configured to configure a group identifier of the physical downlink shared channel (PDSCH), where the group identifier is further used to indicate the priority of the hybrid automatic repeat response request acknowledgement (HARQ-ACK) information corresponding to the physical downlink shared channel (PDSCH), and a sending module 720, configured to send indication information to the terminal, where the indication information includes an information field used to indicate the group identifier of the physical downlink shared channel (PDSCH).

In an embodiment, the processing module 710 is further configured to determine a corresponding value according to the priority of the HARQ-ACK information, and determine the value as a value of the group identifier of the physical downlink shared channel (PDSCH).

In an embodiment, the processing module 710 is further configured to, in response to the HARQ-ACK information being the first priority, determine that the priority of the HARQ-ACK information corresponds to the first value. The processing module 710 is further configured to, in response to the HARQ-ACK information being a second priority, determine that the priority of the HARQ-ACK information corresponds to a second value, and the first priority is higher than the second priority.

In an embodiment, the access network device operates at least partially in an unlicensed frequency band.

To sum up, the communication apparatus provided in this embodiment indicates the priority of the HARQ-ACK information corresponding to the PDSCH by means of the information field of the group identifier of the PDSCH, such that even in an application scenario of an unlicensed frequency band, the priority of the HARQ-ACK information can also be indicated, thereby performing scheduling of different priorities according to service types, avoiding modifications to a DCI format of an existing protocol, and improving the simplicity and consistency of the protocol.

Figure 8:
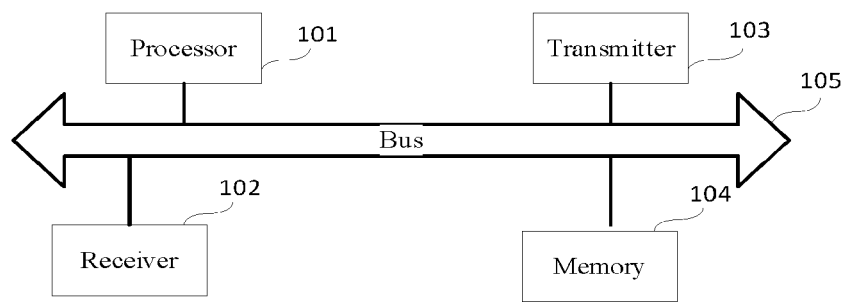
FIG. 8 is a structural block diagram of a communication apparatus provided by an embodiment of the present disclosure.

FIG. 8 shows a schematic structural diagram of a communication device (terminal or access network device) provided by an embodiment of the present disclosure. The terminal includes: a processor 101, a receiver 102, a transmitter 103, a memory 104 and a bus 105.

The processor 101 includes one or more processing cores, and the processor 101 executes various functional applications and information processing by running software programs and modules.

The receiver 102 and the transmitter 103 may be implemented as one communication component, which may be a communication chip.

The memory 104 is connected to the processor 101 through the bus 105. The memory 104 may be configured to store at least one instruction, and the processor 101 may be configured to execute the at least one instruction, so as to implement various steps in the foregoing method embodiments.

Additionally, memory 104 may be implemented by any type or combination of volatile or non-volatile storage devices, including but not limited to: magnetic or optical disks, electrically erasable programmable read only Memory (EEPROM), erasable programmable read only memory (EPROM), static random access memory (SRAM), read-only memory (ROM), magnetic memory, flash memory, programmable read-only memory (PROM).

A non-transitory computer-readable storage medium, when the instructions in the non-transitory computer storage medium are executed by the processor of the terminal, the terminal is enabled to execute the above communication method.

An embodiment of the present disclosure also provides a communication system. The system includes a terminal and an access network device.

The terminal includes the communication apparatus provided in the embodiment shown in FIG. 5 or FIG. 6.

The access network device includes the communication apparatus provided in the embodiment shown in FIG. 7.

An embodiment of the present disclosure further provides a computer-readable storage medium, where at least one instruction, at least one piece of program, code set or instruction set is stored in the computer-readable storage medium. The at least one instruction, the at least one piece of program, the code set or the instruction set is loaded and executed by the processor to implement the steps in the communication method provided by the above method embodiments executed by the terminal.

The beneficial effects brought by the technical solutions provided by the embodiments of the present disclosure include at least:

The priority of the HARQ-ACK information corresponding to the PDSCH is indicated by the information field of the group identifier of the PDSCH, so that even in the application scenario of the unlicensed frequency band, the priority of the HARQ-ACK information can be indicated, thereby performing scheduling of different priorities according to service types, avoiding the modifications of a DCI format of an existing protocol, and improving the simplicity and consistency of the protocol.

It should be understood that references herein to "a plurality" means two or more. "And/or", which describes the association relationship of the associated objects, means that there can be three kinds of relationships. For example, A and/or B can mean that there are three situations: A exists alone, A and B exist at the same time, and B exists alone. The character "/" generally indicates that the front and rear related objects are an "or" relationship.

After considering the specification and practicing the invention disclosed herein, it is easy for those skilled in the art to think of other embodiments of the disclosure. This disclosure is intended to cover any variations, uses, or adaptations of this disclosure that follow the general principles of this disclosure and include common general knowledge or techniques in the technical field not disclosed by this disclosure. The specification and examples are to be regarded as only, with the true scope and spirit of the disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A communication method, performed by a terminal, comprising:
   receiving indication information, the indication information comprising an information field for indicating a group identifier of a physical downlink shared channel (PDSCH), wherein the group identifier is used for determining a group to which the PDSCH belongs;
   determining a priority of hybrid automatic repeat request-acknowledgement (HARQ-ACK) information corresponding to the PDSCH, according to a value of the group identifier;
   wherein the determining the priority of the HARQ-ACK information according to the value comprises:
   determining the HARQ-ACK information as a first priority in response to determining that the information field of the group identifier takes a first value; and
   determining the HARQ-ACK information as a second priority in response to determining that the information field of the group identifier takes a second value, wherein the first priority is higher than the second priority;
   and wherein the method further comprises:
   transmitting the HARQ-ACK information by placing the HARQ-ACK information in a first HARQ-ACK codebook in response to determining that the information field of the group identifier takes the first value, wherein the first HARQ-ACK codebook is a first priority codebook; and
   transmitting the HARQ-ACK information by placing the HARQ-ACK information in a second HARQ-ACK codebook in response to determining that the information field of the group identifier takes the second value, wherein the first HARQ-ACK codebook is a second priority codebook.

2. The method according to claim 1, wherein, the method further comprises: transmitting the HARQ-ACK information by placing the HARQ-ACK information in a HARQ-ACK codebook corresponding to the priority.

3. The method according to claim 2, wherein, the method further comprises:
   transmitting the HARQ-ACK codebook according to the priority of the HARQ-ACK codebook, in response to determining that at least two physical uplink control channel (PUCCH) resources carrying HARQ-ACK codebook conflict in time domain.

4. The method according to claim 1, wherein, the method further comprises:
   transmitting the first HARQ-ACK codebook and discarding the second HARQ-ACK codebook, in response to determining that physical uplink control channel (PUCCH) resources carrying the first HARQ-ACK codebook and the second HARQ-ACK codebook conflict in time domain.

5. The method according to claim 1, wherein, the indication information comprises at least one of radio resource control (RRC) signaling, medium access control control element (MAC CE) or physical layer downlink control information.

6. The method according to claim 1, wherein, the terminal operates at least partially in an unlicensed frequency band.

7. A communication method, performed by an access network device, comprising:
configuring a group identifier of a physical downlink shared channel (PDSCH), wherein the group identifier is used for indicating a priority of hybrid automatic repeat response request-acknowledgement (HARQ-ACK) information corresponding to the physical downlink shared channel (PDSCH); and
sending indication information to a terminal, wherein the indication information comprises an information field for indicating the group identifier of the PDSCH;
wherein the priority of the HARQ-ACK information corresponding to the PDSCH is determined by the terminal according to a value of the information field of the group identifier through following steps:
determining the HARQ-ACK information as a first priority in response to determining that the information field of the group identifier takes a first value; and
determining the HARQ-ACK information as a second priority in response to determining that the information field of the group identifier takes a second value, wherein the first priority is higher than the second priority;
wherein, the HARQ-ACK information is transmitted by the terminal placing the HARQ-ACK information in a first HARQ-ACK codebook in response to determining that the information field of the group identifier takes the first value, wherein the first HARQ-ACK codebook is a first priority codebook; and
the HARQ-ACK information is transmitted by the terminal placing the HARQ-ACK information in a second HARQ-ACK codebook in response to determining that the information field of the group identifier takes the second value, wherein the first HARQ-ACK codebook is a second priority codebook.

8. The method according to claim 7, wherein, the configuring the group identifier of the physical downlink shared channel (PDSCH) comprises:
determine a corresponding value according to the priority of the HARQ-ACK information; and
determining the value as a value of the group identifier of the physical downlink shared channel (PDSCH).

9. The method according to claim 8, wherein, the determining the corresponding value according to the priority of the HARQ-ACK information comprises:
determining that the priority of the HARQ-ACK information corresponds to a first value, in response to the HARQ-ACK information being a first priority; and
determining that the priority of the HARQ-ACK information corresponds to a second value, in response to the HARQ-ACK information being a second priority, wherein the first priority is higher than the second priority.

10. The method according to claim 7, wherein, the access network device operates at least partially in an unlicensed frequency band.

11. A terminal, comprising:
a processor; and
a non-transitory computer-readable storage medium coupled to the processor and storing programming instructions for execution by the processor, the programming instructions instruct the processor to:
receive indication information, the indication information comprising an information field for indicating a group identifier of a physical downlink shared channel (PDSCH), wherein the group identifier is used for determining a group to which the PDSCH belongs; and
determine a priority of hybrid automatic repeat request-acknowledgement (HARQ-ACK) information corresponding to the PDSCH, according to a value of the information field of the group identifier:
wherein the programming instructions further instruct the processor to:
determine the HARQ-ACK information as a first priority in response to determining that the information field of the group identifier takes a first value; and
determine the HARQ-ACK information as a second priority in response to determining that the information field of the group identifier takes a second value, wherein the first priority is higher than the second priority;
and wherein the programming instructions further instruct the processor to:
transmit the HARQ-ACK information by placing the HARQ-ACK information in a first HARQ-ACK codebook in response to determining that the information field of the group identifier takes the first value, wherein the first HARQ-ACK codebook is a first priority codebook; and
transmit the HARQ-ACK information by placing the HARQ-ACK information in a second HARQ-ACK codebook in response to determining that the information field of the group identifier takes the second value, wherein the first HARQ-ACK codebook is a second priority codebook.

12. The terminal according to claim 11, wherein, the programming instructions further instruct the processor to:
transmit the HARQ-ACK information by placing the HARQ-ACK information in a HARQ-ACK codebook corresponding to the priority.

13. The terminal according to claim 12, wherein, the programming instructions further instruct the processor to:
transmit the HARQ-ACK codebook according to the priority of the HARQ-ACK codebook, in response to determining that at least two physical uplink control channel (PUCCH) resources carrying HARQ-ACK codebook conflict in time domain.

14. The terminal according to claim 11, wherein, the programming instructions further instruct the processor to:
transmit the first HARQ-ACK codebook and discard the second HARQ-ACK codebook, in response to determining that physical uplink control channel (PUCCH) resources carrying the first HARQ-ACK codebook and the second HARQ-ACK codebook conflict in time domain.

* * * * *